United States Patent
Buch et al.

(10) Patent No.: US 7,515,371 B1
(45) Date of Patent: Apr. 7, 2009

(54) CHANNEL POSTAMBLE EXTENSION TO DE-GAUSS POLE TIPS

(75) Inventors: Bruce Buch, Westborough, MA (US); Michael Mallary, Sterling, MA (US); Richard Olsen, Framingham, MA (US)

(73) Assignee: Maxtor Corporation, Longmont, CO (US)

( * ) Notice: Subject to any disclaimer, the term of this patent is extended or adjusted under 35 U.S.C. 154(b) by 195 days.

(21) Appl. No.: 11/436,935

(22) Filed: May 18, 2006

Related U.S. Application Data (60) Provisional application No. 60/682,437, filed on May 19, 2005.

(51) Int. Cl.
*G11B 5/03* (2006.01)

(52) U.S. Cl. .............................. 360/66; 360/46; 360/67; 360/68

(58) Field of Classification Search .................... 360/46, 360/66–68
See application file for complete search history.

(56) References Cited

U.S. PATENT DOCUMENTS

| | | | | |
|---|---|---|---|---|
| 4,670,799 A | * | 6/1987 | Ogura et al. .................. | 360/66 |
| 4,821,127 A | * | 4/1989 | Soga et al. ..................... | 360/66 |
| 4,970,621 A | * | 11/1990 | Gailbreath et al. .......... | 361/149 |
| 5,168,395 A | * | 12/1992 | Klaassen et al. .............. | 360/46 |
| 5,499,156 A | * | 3/1996 | Bentley ....................... | 361/150 |
| 6,028,727 A | * | 2/2000 | Vishakhadatta et al. ....... | 360/51 |
| 6,038,093 A | * | 3/2000 | Takada et al. ................. | 360/66 |
| 7,092,186 B1 | * | 8/2006 | Hogg .......................... | 360/60 |
| 2005/0190476 A1 | * | 9/2005 | Wilson et al. ................. | 360/46 |
| 2005/0200997 A1 | * | 9/2005 | Cronch et al. ................ | 360/55 |
| 2005/0243457 A1 | * | 11/2005 | Akamatsu et al. ............. | 360/55 |
| 2006/0176597 A1 | * | 8/2006 | Ngo et al. ..................... | 360/46 |

* cited by examiner

*Primary Examiner*—Hoa T Nguyen
*Assistant Examiner*—Dismery E Mercedes
(74) *Attorney, Agent, or Firm*—Cesari and McKenna, LLP; Patricia A. Sheehan (57) ABSTRACT

A technique for de-gaussing the pole tips and yoke of a write transducer in a perpendicular magnetic recording system is provided. An oscillator in the read channel is configured to produce an adjustable signal pattern output to the preamplifier when a write operation ends for a given time and at a predetermined frequency, such that as the preamplifier write current decays, it decays with transitions (polarity reversals). This results in a decaying AC field being applied to the write transducer at the end of a media write operation, effectively de-gaussing it and reducing the effects of remanent magnetization remaining in the poles and yoke of the magnetic recording head after a write current is turned off. This defeats a potential pole tip lockup or yoke lockup circumstance in the magnetic recording media which can result in an inability to write further data or a possible erasure of valid data on the hard disk with which the write head is associated.

14 Claims, 5 Drawing Sheets

CHANNEL POSTAMBLE EXTENSION TO DE-GAUSS POLE TIPS

CROSS-REFERENCE TO RELATED APPLICATION

The present application claims the benefit of U.S. Provisional Patent Application Ser. No. 60/682,437, which was filed on May 19, 2005, by Buch, et al. for a CHANNEL POSTAMBLE EXTENSION TO DE-GAUSS POLE TIPS, which provisional application is hereby incorporated by reference as though fully set forth herein.

BACKGROUND OF THE INVENTION

1. Field of the Invention

This invention relates generally to hard disk drives for use in magnetic recording, and in particular, relates to techniques for resisting remanent magnetization in head components.

2. Background Information

Hard disk drives (HDDs) manage a large capacity of information being written to and retrieved from the media of disk platters controlled by the drive. A hard disk drive includes I/O interfaces, read and write head components, encoding and decoding components and servo mechanisms that appropriately position the respective heads over the recording media. These components are controlled by integrated circuits which perform signal processing, encoding and decoding and control the operation of a given head as it writes data to and retrieves data from a disk. In particular, a hard disk drive contains an HDD controller circuit which is coupled to the I/O interface and receives input data and transmits data that has been read from the drive. The hard disk drive also includes a read/write channel integrated circuit, which is referred to herein as the "read channel." During operation, the read channel receives a digital data stream and encodes the data by a variety of modulation processes into an encoded data sequence. The read channel causes the encoded data to modulate voltage reversals such that, for example, a voltage reversal occurs corresponding to the center of each data cell where a "1" occurs. If the data cell contains a "0" no voltage reversal occurs. The read channel uses digital signal processing techniques in addition to data encoding schemes and digital filtering to optimize this process. The read channel also decodes servo-information used for positioning drive heads during seeking and tracking operations.

The alternating voltage pattern corresponding to the encoded input data stream is send to a preamplifier integrated circuit, sometimes referred to as the "preamplifier." The preamplifier amplifies the signal from the read channel and produces an alternating current sequence corresponding to the timing of the input voltage changes. This current signal is then applied to the drive head to write the data as a series of magnetic transitions on the disk media in a write operation. The preamplifier circuit, in a read operation, amplifies analog signals that correspond with data read from the disk before such signals are sent to the read channel for digitization.

In a write operation, a write gate signal is asserted by either the read channel or an HDD controller, and the signal is sent to the preamplifier. The preamplifier responds with its transducer current amplitude being either on or off in response to this write gate signal. Thus, the write gate signal, when asserted, causes the preamplifier to turn the transducer current amplitude on. As described in further detail herein, the preamplifier reverses transducer current polarity based upon write data sent to it from the read channel. Specifically, the write transducer contains magnetic poles and one or more drive coils that convert the electrical signals to magnetic signals, which in turn cause the magnetic domains in the disk media to transition (change directions) or remain unchanged in direction.

The hard disk drive follows a procedure to properly end a write operation. The first event of this sequence is the de-assertion of the channel write gate signal, which in turn causes the read channel to flush the data symbols that were input to the channel up to this point. Thereafter, the channel begins output of a "postamble" pattern. This postamble pattern is a set of transitions used to provide an end condition needed to reliably identify the last data symbol written upon read back. After sufficient postamble has been output, the preamplifier write gate signal is de-asserted, which causes the preamp to turn off write current. However, this turn off is not instantaneous, and in practice, the write current output of the preamplifier takes some time to decay.

This final write current polarity and amplitude can result in remanent magnetization at the poles of the write transducer or in the yoke of the drive head. It takes some time for this remanent magnetization to relax. More specifically, after several nanoseconds it has been found that only 60% of the remanent magnetization may have relaxed, which means that up to 40% of the remanent magnetization continues to be emanated from the write transducer of the head. Thus, spurious data may be written to the disk by this write transducer remanent magnetization, or valid data may be erased from the media by continuing the magnetic field from the write transducer into the next track or sector of the disk. If the magnetic remanence continues unchecked over a greater time period, it can eventually lead to pole tip lockup or a lockup of another part of the head, such as the yoke, which is unacceptable.

In order to address the problem of remanent magnetization after a write operation, it has been suggested in the prior art to provide the preamplifier circuit with an oscillator that generates an AC signal, to perform an AC de-gaussing operation. However, this requires an oscillator, which is not otherwise necessary, to be included in the preamplifier thereby resulting in additional costs and complexities in manufacturing the preamplifiers. Such a redesign of preamplifiers not only increases the overall cost of manufacturing and design of the hard disk drive, but may also result in performance degradation. Specifically, the types of oscillators that are suggested for the preamplifiers can have poor frequency tolerance that can result in format efficiency loss in lower frequency conditions. Furthermore, many drives use preamps of different types and from different vendors, such that there are part-to-part variations among manufacturers. A preamplifier based de-gaussing solution would require a consistent circuit across a plurality of preamplifiers and a plurality of vendors, and this could become infeasible due to the part-to-part variations that already exist among the preamplifiers from various vendors.

Further disadvantages faced in providing an oscillator in the preamplifier include the fact that the preamplifier chip is usually highly temperature sensitive and voltage sensitive. Thus, the exact output of an oscillator signal produced in a preamplifier cannot always be predicted due to this variation in operating characteristics.

Some other solutions that have been proposed in the prior art include laminating the pole tips in order to reduce the effect of magnetic remanence as the write current decays. However, pole tip lock up can occur even with such lamination, if the remanent field strength exceeds the coercivity of the media. Furthermore, laminating the pole tips will not address the problem of yoke lockup due to remanent magnetization after a write operation.

Other factors can increase the adverse effects of remanent magnetization. For example, the risk of unwanted erasure due to pole tip lock up is further enhanced in zones of the disk or tracks which are exposed over and over. In fact, there can be a 25% amplitude loss in the magnetics contained within over-exposed zones, thus making them more susceptible to erasure. Remanent magnetization can also lead to unwanted domain walls which can contribute to the lock up. Areas of the media that may have been subjected to a DC erase process also contribute to the potential for lock up, particularly in a perpendicular magnetic recording system.

It is thus an object of the invention to provide a de-gaussing solution for an HDD, which substantially eliminates drive head component lockup due to remanent magnetization in HDDs that does not require a redesign of the preamplifier or other components and does not add further costs to manufacture of the HDD.

SUMMARY OF THE INVENTION

The disadvantages of prior techniques are overcome by the present invention which provides a de-gaussing solution that can be implemented in the read channel and which can thus be used across all drive types in a product generation. In accordance with the invention, an oscillator in the read channel is configured to produce, for a given time and at a predetermined frequency, a signal pattern output to the preamplifier at the end of a write operation, after the preamplifier write gate signal has been turned off. Consequently, as the preamplifier write current decays, it decays with transitions (polarity reversals) guided by this oscillator pattern. This results in a decaying AC field being applied to the write transducer at the end of a media write operation, contributing to de-gaussing the transducer. In accordance with the invention, the length of time, which the oscillator pattern is driven by the read channel to the preamplifier, is referred to herein as the "de-gaussing interval." The length of the de-gaussing interval, and the frequency of the signal driven during the de-gaussing interval by the read channel, can either or both be adjusted depending on the various desired operational parameters and the components that are being used in the particular application of the invention.

Preferably, the de-gaussing signal is produced by a read channel in which the frequency of the signal providing the transitions during the de-gaussing interval can be selected and set at a fixed frequency, as desired in a particular application of the invention. Alternatively, there are some commercially available read channel implementations in which only zone frequencies are produced such that the frequency of the signals available in the channel to be driven to the preamplifier are zone dependent. It is noted that the signal period can be adjusted, wherein the signal period is defined herein as an arbitrary number of multiples or fractions of the minimum write transition period for the zone. In such a zone-dependent case, the degaussing operation of the present invention can still be accomplished. In accordance with the invention, it is preferred to adjust the length of the degaussing interval to substantially match the preamp decay interval for both fixed frequency and zone-dependent frequency degauss operations. If the interval length is determined in cycles of fixed frequency, the cycle count is fixed, while if the interval length is formed from cycles of a zone-dependent frequency, then the number of cycles must be varied with zone in order to keep the length of the degaussing interval matched to the preamp decay interval. Illustratively, the programming of the preamplifier can also be readjusted so that it does not mute write current transitions, if it had been previously programmed to perform such a muting function.

To summarize, the invention provides a channel based de-gaussing solution that does not require a re-design of drive components, and in which the preamplifier responds to the inventive oscillator signal pattern from the read channel by reversing its transducer current polarity, and the preamplifier will respond to the write gate signal by ending, gradually, the transducer current amplitude. This results in the transducer receiving polarity reversals at an appropriate frequency for the transducer and of amplitude which decreases to zero over a duration of several cycles, thereby de-gaussing the transducer so that the effects of remanent magnetization in the poles and yoke of the drive head will be substantially reduced or eliminated.

BRIEF DESCRIPTION OF THE DRAWINGS

The above and further advantages of the invention can be better understood with reference to the accompanying drawings, in which.

DETAILED DESCRIPTION OF AN ILLUSTRATIVE EMBODIMENT

Figure 1:
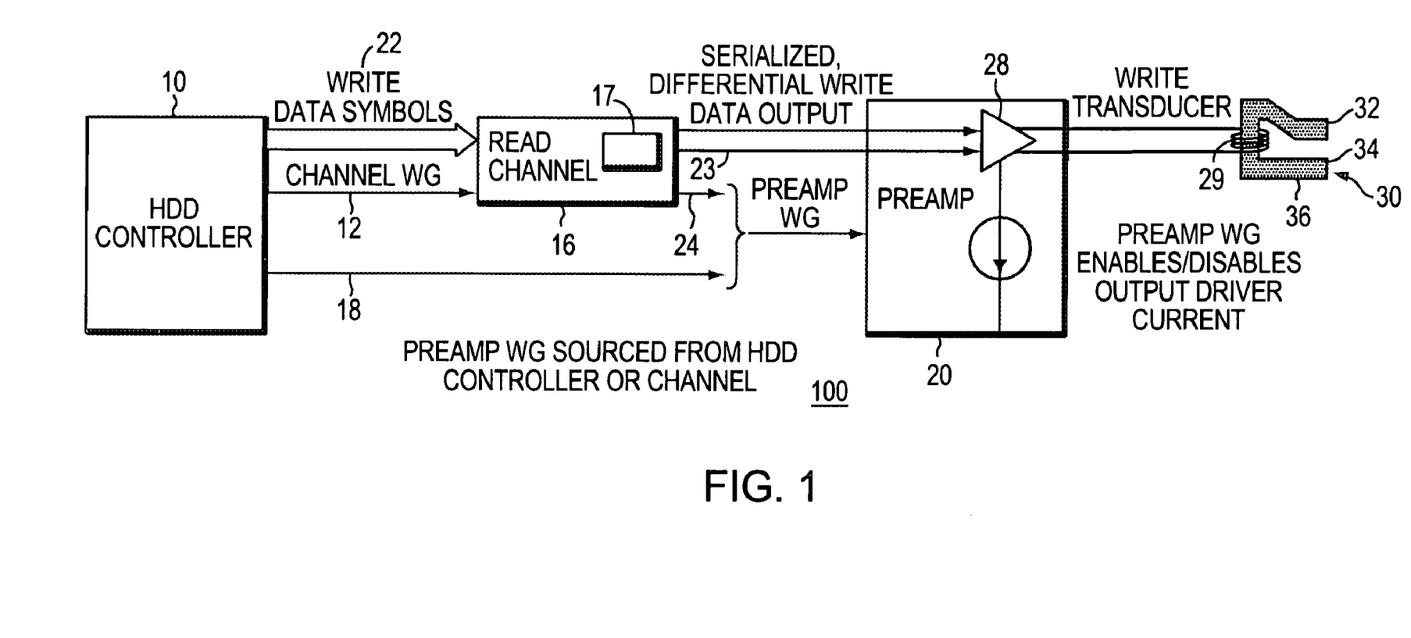
FIG. 1 is a schematic block diagram of the components of a hard disk drive in accordance with which an illustrative embodiment of the present invention may be employed.

FIG. 1 illustrates a schematic block diagram of a portion of a hard disk drive 100 in which the techniques of the present invention may be implemented. The hard disk drive 100 includes HDD controller 10. HDD controller 10 is a suitable microprocessor and accompanying electronics which are configured to receive I/O inputs from a user or a computer for either writing data or requesting files stored on the disks which are served by the hard disk drive. In a write operation, the HDD controller 10 generates a channel write gate signal (schematically illustrated by reference character 12) and passes this write gate signal to a read channel electronic circuit 16. Additionally, a second write gate signal 18 can be generated by the HDD controller 10 and transmitted to a preamplifier circuit 20. The assertion of this write gate signal 18 causes the preamplifier 20 to enable write current and to begin writing data.

The HDD controller 10 passes write data symbols that it has received from the I/O interface (not shown) to the read channel 16, as illustrated by the arrow 22. The read channel 16 includes electronics to decode the digital data symbols received from the HDD controller 10 and to convert the resulting signals into serialized differential write data output analog signals 23. An oscillator 17 in the read channel 16 produces the voltage transitions that carry the differential write data output analog signals. The oscillator 17 is depicted as a single component for clarity of illustration in FIG. 1, however, further details of this aspect of the invention are provided herein with reference to FIG. 4.

The preamplifier 20 includes an amplifier 28 which amplifies the serialized differential write data analog output signals received from the read channel. Notably, in a write operation, the write gate signal 18 is asserted by either the read channel 16 or the HDD controller 10, and the signal 18 is sent to the preamplifier 20. The preamplifier responds with its transducer current amplitude being turned on in response to this write gate signal 18. The preamplifier 20 reverses the transducer current polarity based upon the write data 23 sent to it from the read channel 16. The preamplifier write current is transmitted to one or more drive coils 29 of the write transducer 30 of the drive head. The write transducer 30 has pole tips 32 and 34, and supporting yoke 36. Magnetic signals, which correspond to the electrical signals sent from the preamplifier 20, are induced at the pole tips when the write current is applied to the drive coil 29. The write transducer 30 applies these magnetic signals to the hard disk media (not shown) at a desired location on the media to write the serialized bit stream onto the media.

Figure 2:
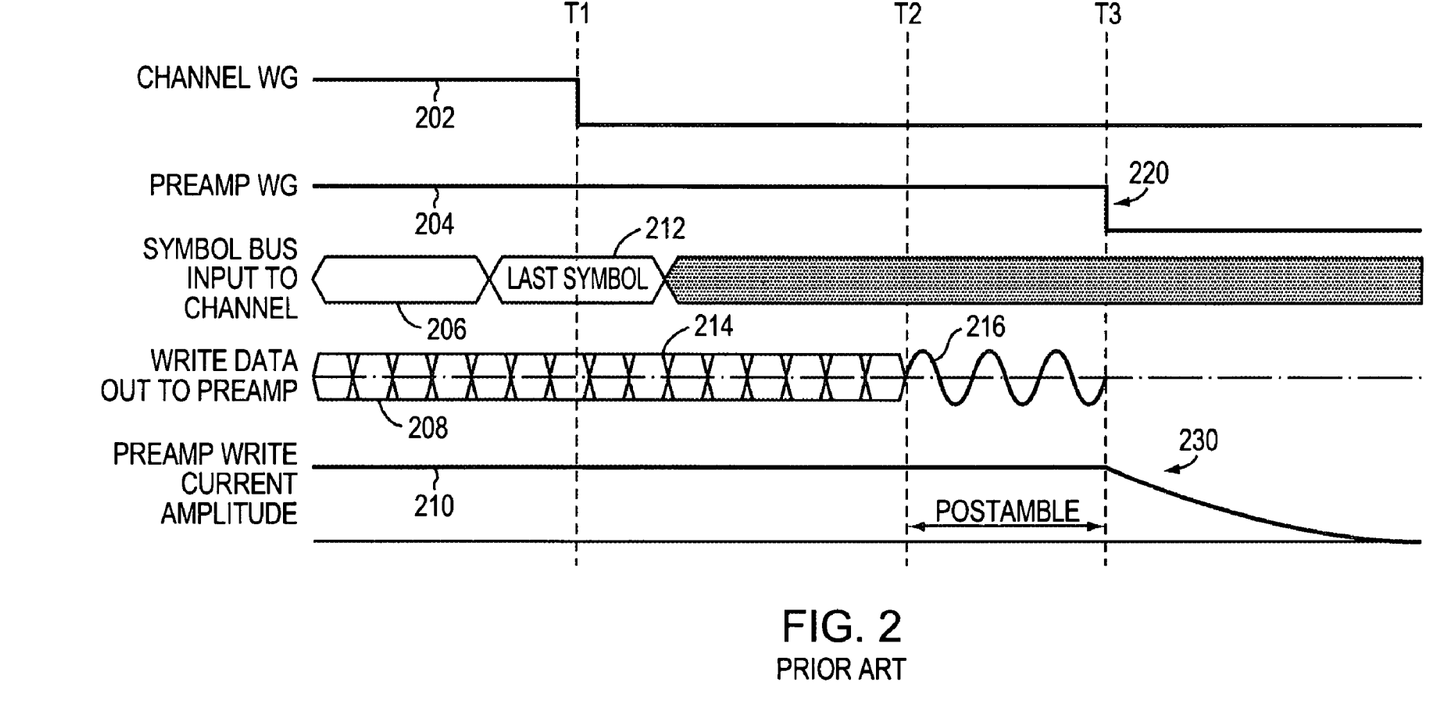
FIG. 2 is a prior art timing diagram showing the output signals of each component at the end of a write operation for a hard disk drive using prior techniques.

A timing diagram of a write operation in accordance with the prior art is illustrated in FIG. 2. Prior to the time T1 in FIG. 2, a write operation is ongoing. During the write operation, the channel write gate signal 202 is asserted as described with reference to FIG. 1. The preamp write gate signal 204 is also asserted which means that the preamplifier current amplitude 210 is turned on, as illustrated in FIG. 2. The symbol bus input from the HDD controller to the read channel contains the write data symbols which are transmitted from the HDD controller to the read channel, as illustrated by the signal 206 in FIG. 2. The read channel is writing data out to the preamp in the form of transitions as shown in the signal 208 in FIG. 2.

The read channel is informed of a desired write end by de-assertion of the channel write gate signal 202 by the HDD controller. The read channel thus determines a last symbol 212 and appends a postamble pattern 216. This is used on read back to provide an end condition that ensures that the end of the user data immediately preceding the postamble is reliably detected. The preamp write gate signal is de-asserted, as shown by reference character 220 of the signal 204. In turn, the preamplifier terminates write current 210. The write current begins to decay, as shown at portion 230 of the signal 210. When the write current being driven to the coil 29 (FIG. 1) is terminated, and if it is allowed to simply return to zero, the magnetic state of the transducer may or may not decay to zero over some length of time. This can result in magnetic remanence causing unwanted writing to the media, or erasure of valid data on the media.

The write current signal can be caused to decay in amplitude while being repeatedly reversed in polarity, thereby enhancing and accelerating the demagnetization of the transducer. To that end, in accordance with the invention, the controller 10 adjusts the read channel circuitry 16 such that its oscillator 17 generates a transitioning signal after the postamble signal, during a degaussing interval which results in the desired degaussing waveform being driven from the preamplifier to the write transducer, after time T3.

Figure 3:
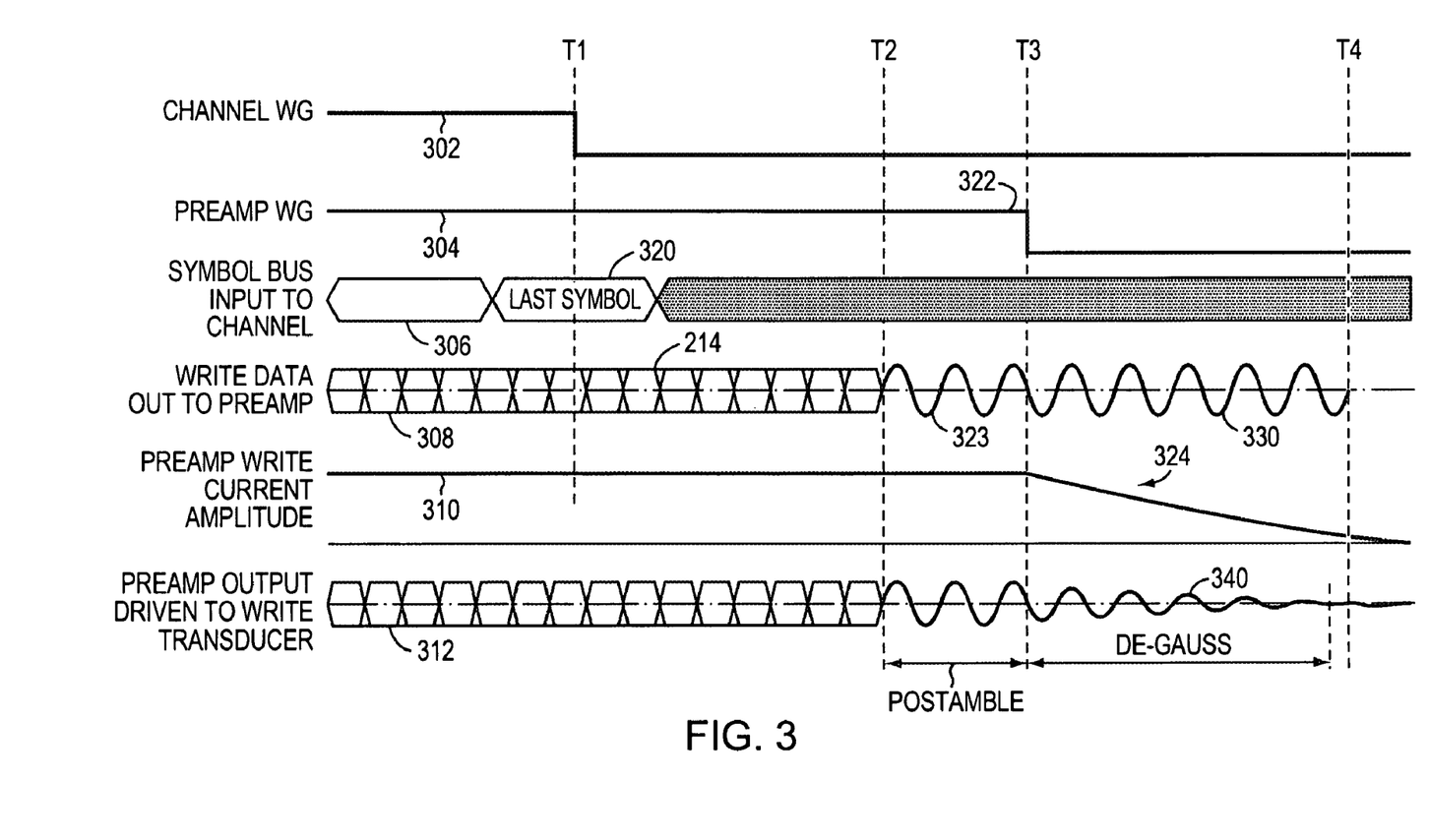
FIG. 3 is a timing diagram illustrating the output signals of each component in an illustrative hard disk drive at the end of a write operation in accordance with an illustrative embodiment of the present invention.

More specifically, the signaling sequence in accordance with the invention is illustrated in FIG. 3. During a write operation, the channel write gate signal 302 is high. The preamp write gate signal 304 is also asserted. The symbol bus input to the read channel 16 from the HDD controller 10 is shown as signal 306. The write data output driven to the preamp from the read channel is ongoing as shown by signal 308. The preamp write current amplitude 310 is turned on during the write operation in response to the write gate signal 304 being asserted. The preamp output driven to the write transducer is shown as signal 312.

At the end of the write operation, (time T1) the channel write gate signal is de-asserted when the HDD controller sends a "last symbol" code 320 to the read channel. When the last symbol has been serialized and output to the preamp, the read channel generates a postamble pattern 323 which is sent to the preamplifier. In addition, the preamp write gate signal is de-asserted as designated by reference character 322. In response to the de-asserted write gate signal, the preamp write current 310 begins to decay in amplitude at point T3.

In accordance with the invention, the time period after the postamble ends, which in FIG. 3 is illustrated as the time period between times T3 and T4, is defined herein as the "degaussing interval." During the degaussing interval, as the preamp write current amplitude begins to decay, as shown at point 324, the read channel 16 is adjusted such that its oscillator 17 drives a transitioning pattern to the preamp at a predetermined frequency. This is illustrated in the signal portion 330 of signal 308, and the transitions are continued to time T4. The continued channel transition signal 330 applied to the decaying write current results in a de-gaussing waveform 340 that is driven to the write transducer. This waveform effectively de-gausses the pole tips and yoke of the write transducer.

Figure 4:
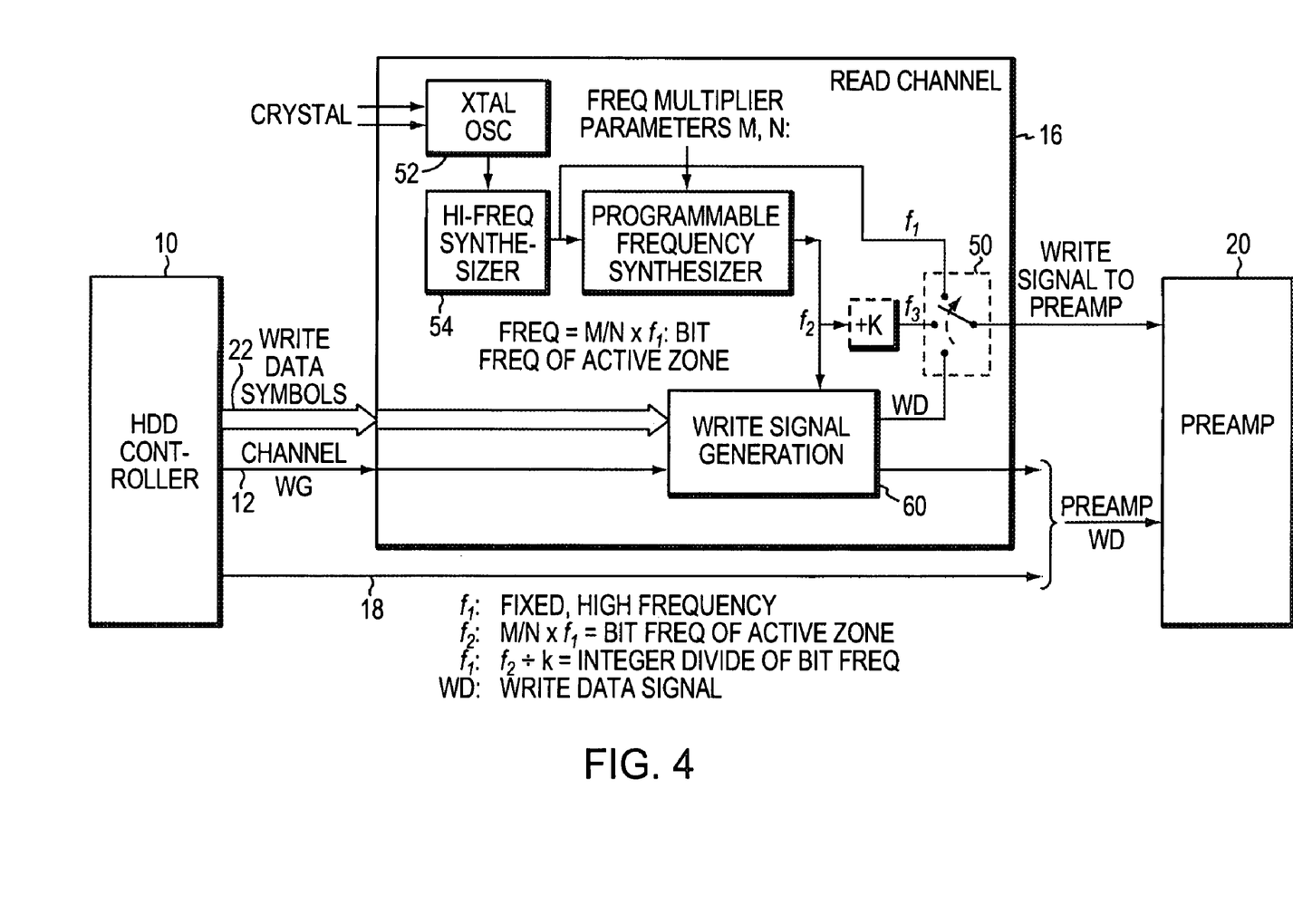
FIG. 4 is a schematic block diagram of one embodiment of a read channel integrated circuit in accordance with an illustrative embodiment of the present invention.

FIG. 4 is a schematic block diagram of one embodiment of a read channel integrated circuit in accordance with an illustrative embodiment of the present invention. The read channel of FIG. 4 can be used to drive the transitioning signal pattern to the preamplifier during the de-gaussing interval of the present invention. It is noted that FIG. 4 is a more detailed schematic of the read channel circuit 16, which was described with reference to FIG. 1, and like components in FIG. 4 have the same reference numerals as in FIG. 1. Specifically, the HDD controller 10 sends write data symbols 22 to the read channel 16 for processing including decoding. A channel write gate signal 12 is also sent from the HDD controller 10 to the read channel 16 when a write operation is to commence. As noted herein, a preamp write gate signal 18 can be generated by either the HDD controller 10, or the read channel 16.

To properly end the write operation, the HDD controller 10 de-asserts the channel write gate 12 which causes the write signal generator 60 to cleanly cease its encoding transfer of write data symbols 22 to write data output via the WD lead of a switch 50, which is described in further detail below. Thereafter the HDD controller outputs a last symbol and the channel appends a postamble sequence. At the completion of the postamble sequence, illustratively, the write signal generator 60 de-asserts the preamp write gate 24. Thereafter the switch 50 selects either of the other two signals to provide the signal pattern to be driven to the preamplifier by the read channel during the degaussing interval.

More specifically, in accordance with the invention, the read channel 16 is configured such that there are several alternative sources of the signals to be driven the preamplifier 20 for write operations and for the de-gaussing function of the present invention. More specifically, the right side of the read channel 16 shows a switch 50 that can be used to select one of three sources for the signal to be driven to the preamplifier 20 by the read channel 16. Specifically, the first signal that can be selected is signal $f_1$. The signal $f_1$ is a high-frequency clock signal generated by frequency multiplication of a reference frequency produced by a crystal oscillator 52 and high frequency synthesizer 54. Its typical usage is as the source from which the active zone bit frequency is synthesized.

The signal $f_2$ is the bit-frequency clock signal for the active zone. It is a rational multiple of $f_1$ generated by a programmable frequency synthesizer. As will be understood by those skilled in the art, the multiplier parameters M and N are changed to generate different frequencies of $f_2$ for the various zones of the drive. However, in accordance with the invention, the signal $f_2$ can be optionally divided by some integer "k" to create an alternative de-gaussing frequency $f_3$. Notably, there are some read drives which only include a zone-dependent signal frequency source and the invention is adaptable for use with such read channel components.

The signal labeled WD in FIG. 4 is the Write Data signal generated by the "Write signal generation" circuit block 60. The Write Signal generation circuit block 60 is primarily responsible for converting the Write Data Symbols input from the controller into the pattern of transitions used to record those symbols on the media. This circuit block 60 is also responsible for outputting the preamble and postamble patterns that envelope the write data sequence, as described herein. The transitions driven onto WD are synchronous to $f_2$, the bit clock for the active zone.

Preferably, the transitioning signal produced by the read channel for degaussing is one in which the frequency can be selected and set at a fixed frequency, as desired in a particular application of the invention, such as described as signal $f_1$ with reference to FIG. 4. In accordance with the present invention, the crystal oscillator 52 is configured to act as a fixed, zone-independent frequency source for the de-gaussing operation described herein.

Alternatively, there are some commercially available read channel implementations in which only zone frequencies are available (i.e., the signal $f_3$ of FIG. 4), such that the frequency of the signals available in the channel to be driven to the preamplifier are zone dependent. It is noted that the signal period can be adjusted, wherein the signal period is defined herein as an arbitrary number of multiples or fractions of the minimum write transition period for the zone.

In the case of a zone dependent frequency, the degaussing operation of the present invention can still be accomplished. In accordance with the invention, it is preferred to adjust the length of the degaussing interval to substantially match the preamp decay interval for both fixed frequency and zone-dependent frequency degauss operations. If the interval length is determined in cycles of fixed frequency, the cycle count is fixed, while if the interval length is formed from cycles of a zone-dependent frequency, then the number of cycles must be varied with zone in order to keep the length of the degaussing interval matched to the preamp decay interval, and thus the number of cycles sent by the read channel to the preamplifier can be adjusted accordingly.

In operation, the read channel switch 50 couples polarity reversals ($f_1$ or $f_3$) to the write data output 23 for the finite duration of the write current turnoff of the preamplifier driver 28, and the preamplifier driver 28 continues to propagate write data reversals during that same finite duration. Then, a desirable degauss (demagnetization) current wave form is thus coupled to the transducer thereby effectively eliminating or curtailing potential remanent magnetization therein.

It should be understood that there is no requirement for signal continuity between the end of postamble from the read channel and the start of signal generated during the de-gaussing interval, and thus the signal generated by the read channel during the de-gaussing interval can be quite different from the postamble signal.

Illustratively, the programming of the preamplifier can also be readjusted so that it does not attempt to mute write current transitions, if it had been previously programmed to perform that function. Furthermore, the source of the de-gaussing signal may be any signal that can be implemented in the read channel of sufficiently high in frequency that it effectively degausses the unwanted magnetic remanence in the pole tips or yoke of the transducer and write head.

Figure 5A:
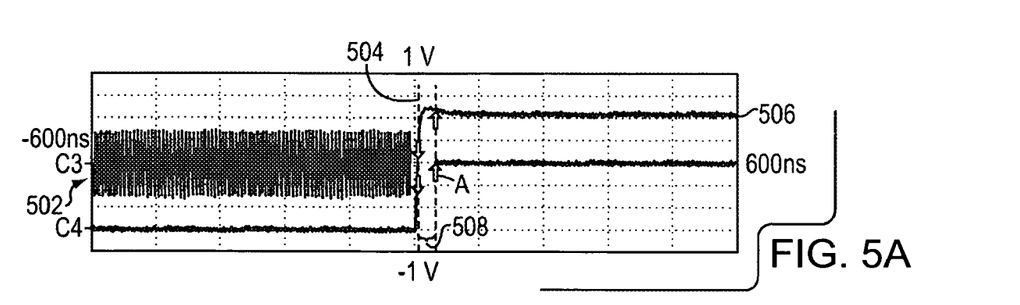
FIGS. 5A and 5B are plots of decay in amplitude of write current versus time for a system not using the techniques of the present invention.
Figure 5B:
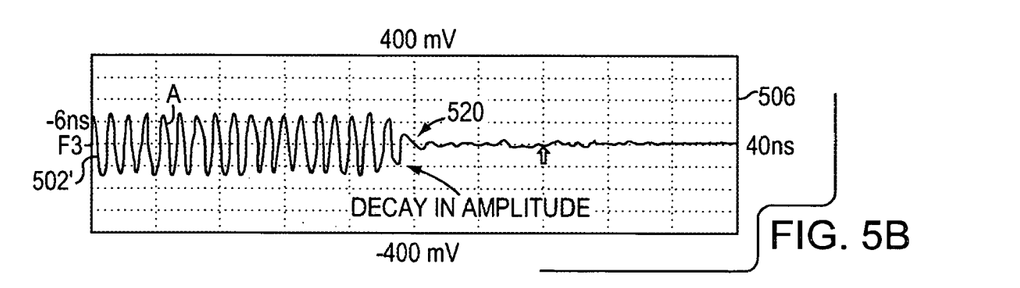

By way of example, a test was conducted for a simulated write operation and the results are illustrated in FIGS. 5A and 5B. This test was conducted without the techniques of the present invention being employed. FIG. 5A is a plot exhibiting the write current amplitude from the preamplifier, as a function of the corresponding voltage signal, expressed in millivolts (mV) versus time, expressed in nanoseconds (ns). The preamp output signal is illustrated as representative signal 502. At the time illustrated by reference character 504, the write gate channel signal is deasserted. The time period designated by reference character 508 in FIG. 5A is enlarged in FIG. 5B, and a reference point is illustrated by the arrow A. Referring to FIG. 5B, it is apparent that the decay in amplitude in the enlarged representation of the signal 502' reaches zero at approximately the time designated by the reference character 520. This test was performed without using the de-gaussing technique of the present invention.

Figure 6A:
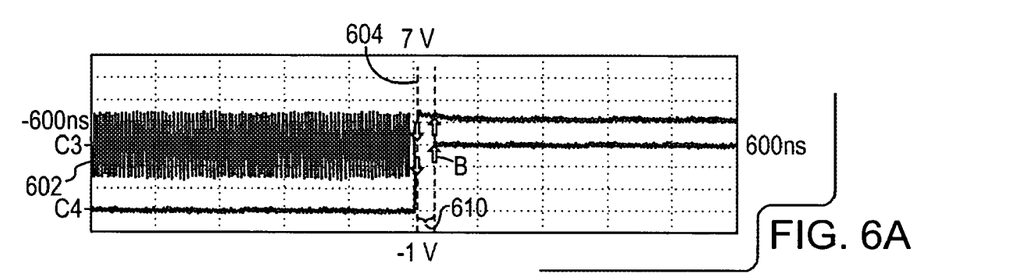
FIGS. 6A and 6B are plots of decay in amplitude of write current versus time in a system in which the techniques of the present invention are applied at the end of a write operation.
Figure 6B:
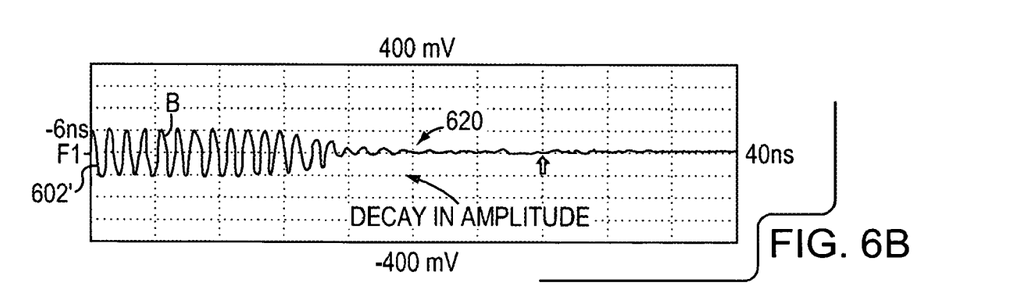

A comparative test was performed in which the de-gaussing operation of the present invention was employed, and the results are shown in FIGS. 6A and 6B. The preamp write current output is illustrated as signal 602. The write gate is de-asserted at the time designated by the reference character 604. The signal decays during the period 610. This time period 610 is enlarged in FIG. 6B, and a reference point is designated by the arrow B. It can be appreciated by visually comparing FIG. 5B with FIG. 6B that the decay in amplitude in the enlarged representation of signal 602' is faster and that the amplitude reaches zero at an earlier time (designated by the reference character 620) than in the test performed without employing the techniques of the present invention.

It should be appreciated that the techniques of the present invention provide a de-gaussing function which reduces remanent magnetization in the pole tips and yoke of a magnetic recording head after write current is turned off. This thereby defeats a potential pole tip lockup or yoke lock up phenomena. The technique can be generated at the read channel which avoids additional costs otherwise associated with designing a specialized preamp circuit. The desired degaussing waveform can be produced in response to a signal, for a desired time interval and at a predetermined frequency that is configured and sent to the transducer from the read channel. In addition, greater adjustability is provided because the read channel can be readily controlled by the user and can be dynamically adjusted for different circumstances, to achieve desired de-gaussing effects.

The forgoing description has been directed to specific embodiments of the invention. It will be apparent, however, that other variations and modifications may be made to the described embodiments with the attainment of some or all of the advantages of such. Therefore, it is the objection of the appended claims to cover all such variations and modifications as come within the true spirit and scope of the invention.

What is claimed is:

1. A disk drive system comprising:
   a controller for writing data symbols as received from an associated I/O interface;
   a read channel circuit which encodes and decodes data symbols and converts digital signals to analog signals to be written to the recording media of one of a plurality of hard disk platters in the disk drive system;

a preamplifier coupled to said read channel, which amplifiers the analog signals and generates a write current signal containing data information and applying the write current signal during a write operation and terminating the write current signal at the end of a write current operation;

a write transducer coupled to receive the write current signal from the preamplifier and configured to apply the write current signal to one or more drive coils wound on a yoke which has associated magnetic pole tips in which a magnetic signal is induced in order to write to said recording media; and said read channel having an adjustable oscillator configured to generate a transitioning signal which is applied to the preamplifier at the end of a write operation, and the preamplifier thereby passing a decaying write current signal with polarity transitions at the end of a write operation, to degauss the pole tips and yoke of the write transducer during a predetermined de-gaussing interval.

2. The disk drive system as defined in claim 1 wherein said transitioning signal produced during the de-gaussing interval by said read channel is adjusted for different zones of the recording media.

3. The disk drive system as defined in claim 1 wherein said transitioning signal produced during the degaussing interval has a predetermined period defined as a multiple or fraction of the write transition for a given zone of the recording media.

4. The disk drive system as defined in claim 1 wherein said transitioning signal produced during the degaussing interval has a fixed frequency independent of a zone of the recording media.

5. The disk drive system as defined in claim 1 wherein the length of write current decay is controllable.

6. The disk drive system as defined in claim 3 wherein the number of cycles sent by the read channel to the preamplifier can be adjusted to achieve the desired degaussing effect.

7. A method of performing a de-gaussing operation in a perpendicular magnetic recording system comprising the steps of:

issuing at a hard disk drive controller a last symbol and sending the last symbol to a read channel to signal the end of a write operation being performed in a zone of recording media in the recording system;

de-asserting a write gate signal sent to an associated preamplifier circuit;

ending at said preamplifier circuit a write current signal being applied to an associated write transducer in a disk drive head, allowing said write current signal to begin to decay; and driving a transitioning signal generated at said read channel to said preamplifier during the decay of said preamplifier write current thereby generating a de-gaussing waveform at said transducer for a predetermined degaussing interval.

8. The method as defined in claim 7 wherein said transitioning signal has a predetermined period defined as a multiple or fraction of the write transition for a given zone of the recording media.

9. The method as defined in claim 7 wherein:
said transitioning signal has a fixed frequency independent of a zone of the recording media.

10. The method as defined in claim 7 including the further step of:
Adjusting the number of cycles of the transitioning signal to substantially match an interval over which the preamplifier write current decays.

11. The method as defined in claim 7 including the further step of:
instructing the preamplifier circuit not to mute write current transitions during the degaussing interval.

12. The method as defined in claim 8 wherein the number of cycles of the transition signal sent by the channel to the preamplifier can be adjusted to achieve the desired degaussing effect.

13. A read channel integrated circuit for a hard disk drive, the read channel integrated circuit comprising:

write data signal generator circuit for converting write data symbols input from a controller into a pattern of transitions driven to an associated preamplifier for recording data symbols on a disk media by an associated write transducer;

a programmable frequency synthesizer configured to generate different frequency signals for write operations at given zones in the disk drive; and a crystal oscillator coupled to a high frequency synthesizer, which together are configured to produce a high-frequency clock signal by frequency multiplication of a reference frequency produced by said crystal oscillator and said high frequency synthesizer such that a fixed, zone-independent frequency transitioning signal is generated and sent to said associated preamplifier circuit at the end of a write operation for performing a de-gaussing operation at said write transducer.

14. A disk drive system comprising:

a read channel circuit which encodes and decodes data symbols and converts corresponding digital signals to analog signals to be written to recording media;

a preamplifier coupled to said read channel, which amplifies the analog signals and generates a corresponding write current signal, the preamplifier applying the write current signal during a write operation and terminating the write current signal at the end of a write operation;

a write transducer coupled to receive the write current signal from the preamplifier and configured to apply the write current signal to one or more drive coils wound on a yoke which has associated magnetic pole tips in which a magnetic signal is induced in order to write to said recording media; and said read channel having an adjustable oscillator configured to produce voltage transitions associated with write data and provide the transitions to the preamplifier during a write operation, and generate a transitioning signal and provide the transitioning signal to the preamplifier at the end of the write operation, and the preamplifier at the end of the write operation thereby passing a decaying write current signal with polarity transitions that correspond to the transitioning signal, to degauss the pole tips and yoke of the write transducer during a predetermined de-gaussing interval.

* * * * *